(12) United States Patent
Tani et al.

(10) Patent No.: US 6,268,978 B1
(45) Date of Patent: Jul. 31, 2001

(54) MAGNETIC DISK APPARATUS

(75) Inventors: Hiroshi Tani, Kanagawa-ken; Hiroyuki Matsumoto, Chigasaki, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/186,666

(22) Filed: Nov. 4, 1998

(30) Foreign Application Priority Data

Nov. 6, 1997 (JP) .................................................... 9-303990

(51) Int. Cl.⁷ .................................................... G11B 21/21
(52) U.S. Cl. .................... 360/135; 360/235.4; 428/65.4; 428/694 BP; 428/695
(58) Field of Search .............................. 360/135, 235.4, 360/235.8, 236.6; 428/65.3, 65.4, 65.5, 65.8, 141, 900, 336, 694 T, 694 TP, 694 TR, 694 BP, 694 BR, 695

(56) References Cited

U.S. PATENT DOCUMENTS

| | | | |
|---|---|---|---|
| 5,010,429 | * 4/1991 | Taguchi et al. | 360/103 |
| 5,062,021 | * 10/1991 | Ranjan et al. | 360/135 |
| 5,079,657 | * 1/1992 | Aronoff et al. | 360/103 |
| 5,219,652 | * 6/1993 | Shimasaki | 428/323 |
| 5,231,613 | * 7/1993 | Nakayama et al. | 369/13 |
| 5,267,104 | * 11/1993 | Albrecht et al. | 360/97.02 |
| 5,459,019 | * 10/1995 | Kato et al. | 430/271 |
| 5,503,922 | * 4/1996 | Shimasaki et al. | 428/323 |
| 5,576,918 | * 11/1996 | Bar-Gadda et al. | 360/135 |
| 5,601,916 | * 2/1997 | Yamazaki et al. | 428/329 |
| 5,607,747 | * 3/1997 | Law et al. | 428/141 |
| 5,618,617 | * 4/1997 | Uchida et al. | 428/323 |
| 5,626,959 | * 5/1997 | Mills et al. | 428/331 |
| 5,768,076 | * 6/1998 | Baumgart et al. | 360/135 |
| 5,774,303 | * 6/1998 | Teng et al. | 360/103 |
| 5,841,608 | * 11/1998 | Kasamatsu et al. | 360/103 |
| 5,875,084 | * 2/1999 | Baumgart et al. | 360/135 |
| 5,910,863 | * 6/1999 | Miyazaki et al. | 360/103 |
| 5,930,073 | * 7/1999 | Tanaka et al. | 360/97.02 |
| 5,949,612 | * 9/1999 | Gudeman et al. | 360/103 |
| 5,991,118 | * 11/1999 | Kasamatsu et al. | 360/103 |
| 6,017,605 | * 1/2000 | Yamazaki et al. | 428/65.3 |

FOREIGN PATENT DOCUMENTS 7-235040 * 9/1995 (JP) .
7-254132 * 10/1995 (JP) .

OTHER PUBLICATIONS

IEEE Transactions on Magnetics, vol. Mag–23, No. 5 pp. 2386–2387, Sep., 1987, "Lubrication Performance of Melamine Cyanurate Composite Lubricant for Think Film Disk Media", T. Miyamoto, et al.

Advances in Information Storage and Processing Systems, ASME, ISPS vol. 1, pp. 117–123, 1995, "Cyclic Phosphazenes as Advanced Lubricants for Thin Film Magnetic Media", D.J. Perettle, et al.

Japan Tribology Society, preliminary lecture collection, 1996–10, pp. 205–206.

Japan Tribology Society, preliminary lecture collection, 1996–5, pp. 50–52.

* cited by examiner

*Primary Examiner*—Brian E. Miller
(74) *Attorney, Agent, or Firm*—Kenyon & Kenyon

(57) ABSTRACT

A magnetic disk apparatus having excellent wear resistance and high reliability can be provided by arranging cylindrical or polygonal cylindrical protrusions or protrusions of honeycomb structure on at least one of a slider surface of the magnetic head and a surface of the magnetic disk and dispersing an additive 19 comprising spherical or polyhedral molecules or particles in the liquid lubricant 9 on the surface of the magnetic disk.

10 Claims, 10 Drawing Sheets

MAGNETIC DISK APPARATUS

BACKGROUND OF THE INVENTION

The present invention relates to a magnetic disk apparatus used for external storage apparatuses of computer systems or the like.

With recent increase in quantity of information, importance of magnetic disk apparatuses as external storage apparatuses is more and more enhanced, and they are always required to have recording capacity of high density.

A magnetic disk apparatus has a magnetic recording medium 1 and a magnetic head 2 (hereinafter referred to as "head") as main constituent elements and further comprises a rotation controlling mechanism 3 of the magnetic recording medium 1, a positioning mechanism 4 for the head 2 and a processing circuit 5 for recorded and reproduced signals. At the time of stopping of the magnetic disk apparatus, the head rests on the magnetic recording medium, and, upon starting of the magnetic disk apparatus, moves above the magnetic recording medium at a very small flying height from the magnetic recording medium or in the state of direct or indirect contact with the magnetic recording medium, thereby to carry out recording and reproducing of information.

In general, in a magnetic disk apparatus, the information is recorded in a large number of tracks provided concentrically or spirally on the magnetic recording medium. In order to improve recording density, it becomes necessary to increase information density in the tracks in circumferential direction (linear recording density). The linear recording density depends on characteristics of magnetic film (coercive force, thickness, etc.) of the magnetic recording medium, head characteristics (frequency characteristics, gap length, etc.) and spacing between the magnetic film of the magnetic recording medium and the head. Recently, this spacing between the head and the magnetic recording medium (herein-after referred to as "flying height") is sharply reduced and is generally 0.05–0.1 $\mu$m. In general magnetic disk apparatuses, it is known that both the magnetic head and the magnetic recording medium are worn in the state of the flying height being very small or in the case of the magnetic recording medium and the head directly or nearly contacting with each other, and this wear causes rupture of information to reduce reliability.

Conventionally, the wear is diminished by forming a film of lubricant such as perfluoro polyether or forming a protective film on the surface of the magnetic head. However, these conventional methods are not satisfactory for the diminishment of the flying height of the future magnetic heads, and further intensive improvement is being attempted.

For example, according to IEEE Transaction on Magnetics, Vol. MAG-23, No.5, pp2386 September, 1987, it is attempted to diminish the frictional force and wear by dispersing spherical fine particles of melamine cyanurate (MCA) in the lubricant on the surface of the magnetic disk medium.

As another method, Advances in Information Storage and Processing Systems ASME, ISPS-Vol.1, pp117, 1995 discloses incorporation and dispersion of a phosphazene ring substituted with fluorinated benzene at a terminal (a spherical molecule or soccer ball-shaped molecule of about 1.2 nm in molecular simulation) in the lubricant film on the disk.

Furthermore, Japan Tribology Society, preliminary lecture collection, 1996-10 (page 205) reports to coat on a magnetic recording medium a spherical lubricant such as a polyester hyperbranch polymer substituted with fluorinated carbon at a terminal.

Moreover, as an example of forming a texture on the magnetic head, Japan Tribology Society, preliminary lecture collection, 1996-5 (page 50) proposes a texture of hexagonal honeycomb structure.

The conventional technique disclosed in the above IEEE Transaction on Magnetics gives no consideration to the texture of a slider surface of the magnetic head, the particle size of MCA and the surface roughness of magnetic disk medium, and this technique suffers from the problem that reliability of magnetic disk apparatus performing recording and reproduction at a small floatation distance cannot be ensured.

The conventional technique disclosed in the above Advances in Information Storage and Processing Systems ASME, ISPS gives no consideration to the roughness of magnetic disk medium and the texture of slider surface of the magnetic head and suffers from the problem that reliability of magnetic disk apparatus performing recording and reproduction at a small floatation distance cannot be ensured.

Furthermore, the conventional technique disclosed in the Japan Tribology Society, preliminary lecture collection, 1996-10 (page 205) uses only a spherical lubricant as a lubricant and does not use as additives to a liquid lubricant, and besides gives no consideration to the roughness of magnetic disk medium and the texture of slider surface of the magnetic head and suffers from the problem that reliability of magnetic disk apparatus performing recording and reproduction at a small floatation distance cannot be ensured.

Moreover, the conventional technique disclosed in Japan Tribology Society, preliminary lecture collection, 1996-5 (page 50) gives no consideration to the optimization of lubricants of the corresponding magnetic disk media and suffers from the problem that reliability of magnetic disk unit performing recording and reproduction at a small floatation distance cannot be ensured.

SUMMARY OF THE INVENTION

The object of the present invention is to provide a magnetic disk apparatus excellent in wear resistance and high in reliability.

For attaining the above object, the magnetic disk apparatus of the present invention has cylindrical or polygonal cylindrical protrusions on at least one of the slider surface of the magnetic head and the surface of the magnetic disk and is provided with a lubricant film on the surface of the magnetic disk, an additive comprising spherical or polyhedral molecules or particles being dispersed in said lubricant film.

Furthermore, for attaining the above object, the magnetic disk apparatus of the present invention has protrusions of honeycomb structure on at least one of the slider surface of the magnetic head and the surface of the magnetic disk and is provided with a lubricant film on the surface of the magnetic disk, an additive comprising spherical or polyhedral molecules or particles being dispersed in said lubricant film.

The additives are preferably carbon, carbon compounds, silicon compounds, phosphorus compounds, etc., and, for example, preferred are those comprising elements of H, C, N, O, F, Si and P. Diameter or maximum diameter of the additives is preferably 0.4–30 nm from the points of the flying height of head, the surface roughness of practical magnetic disk medium and the surface roughness of magnetic head, and is more preferably 0.4–20 nm. If the size of the additives is too large, the flying height of the head increases to cause fluctuation of the flying height at the time of recording and reproduction. If it is too small, they have no meaning as particles to lose the effects of rolling friction and sliding friction. Furthermore, they cause the problem of thermal flying.

The shape of the additives is preferably three-dimensionally spherical or polyhedral. Those of relatively large level of 5–20 nm can be observed by SEM, TEM, etc. As other method for the observation of the shape, the shape of polymeric particles can be presumed by molecular simulation software. In the case of polyhedron, hexahedron or higher polyhedrons are preferred.

These additives may be those which can hardly be chemically activated, and are considered to be lower in catalytic action which accelerates wearing as compared with metallic fine particles and to be smaller in the degree of causing wear depth as compared with metallic fine particles. It is further considered that they have less action to corrode the magnetic disk medium and magnetic head as compared with metallic fine particles.

The additives are added in an amount of preferably 0.5-15 wt %, more preferably 1-10 wt % based on the lubricant.

The protrusions may be arranged periodically or aperiodically, and in the case of honeycomb structure, they may be arranged continuously or separately, namely, some blocks have honeycomb structure and others not.

Height of the protrusion or protrusions of honeycomb structure is suitably 20 times or less and ½ time or more the diameter or maximum diameter of the additives.

It is considered that these protrusions or protrusions of honeycomb structure reduce the contact area between the head and the surface of the magnetic disk medium, but also the additives in the form of sphere or polyhedron stay in the dented portions formed by the protrusions or honeycomb structure and are apt to be retained there whereby friction is diminished by their rolling friction or sliding friction. Moreover, the lubricant is also apt to be retained in the dented portions, which diminishes breakage of the lubricant film at the contact portions between the magnetic head and the magnetic disk medium.

In order to bring out wear resistant effect of the slider surface of the head and the magnetic disk medium, the surface roughness of the magnetic disk medium is preferably 0.2–5 nm in terms of average surface roughness Ra. That is, for retaining the additive in the dented portions of the slider surface of the head, if the roughness of the surface of the magnetic disk medium is great, the space between the dented portions and the surface of the magnetic disk medium increases, and hence the additive cannot be sufficiently retained. Therefore, retention of the additive and flow of the lubricant can be made efficient by controlling the average surface roughness Ra as mentioned above.

As the lubricants, liquid lubricants are preferred. The liquid lubricants can improve corrosion resistance of the magnetic disk medium and diminish the adverse effect caused by adsorption of gas.

The protrusions or honeycomb structure may be provided on at least one of the slider surface of the head and the surface of the magnetic disk, but it is more preferred to provide them on the slider surface of the head than on the whole surface of the magnetic disk because they can be more easily provided on the former. Furthermore, in case of providing the protrusions or honeycomb structure on the surface of the magnetic disk, they are provided preferably on at least the recording surface.

DESCRIPTION OF THE PREFERRED EMBODIMENT

Figure 1:
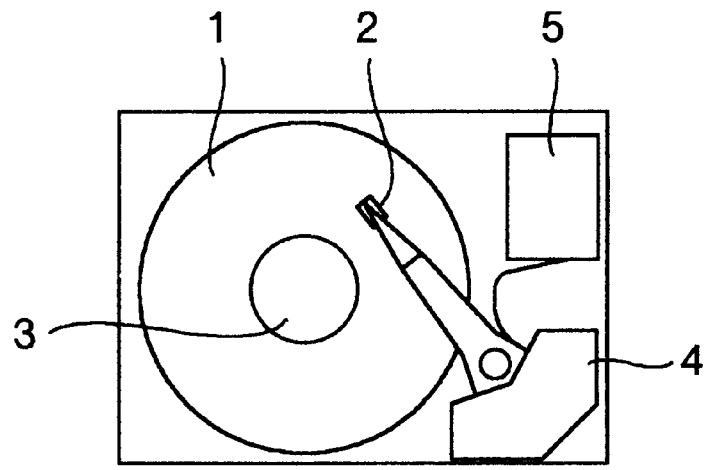
FIG. 1 is a schematic view of a magnetic disk apparatus.
Figure 2:
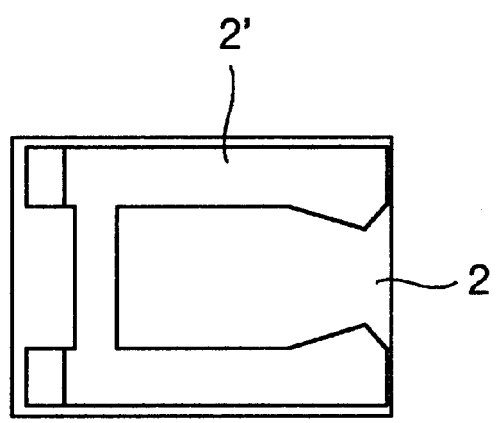
FIG. 2 is a schematic view showing a slider surface of a floating type head slider.
Figure 3:
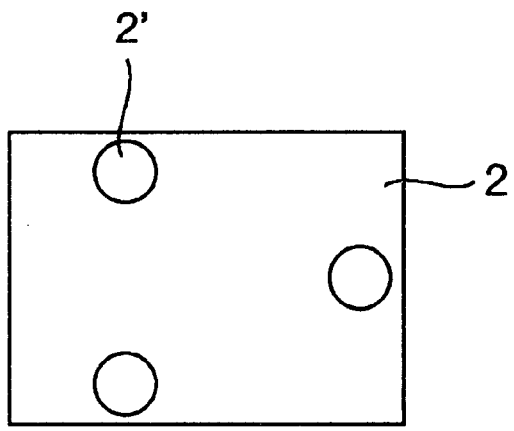
FIG. 3 is a schematic view showing a slider surface of a contact type head slider.

Examples of the present invention will be explained referring to the drawings. Protrusions were formed on the slider surface 2' of a head 2 as shown in FIGS. 2 and 3. In this example, a slider having a specific shape is shown, but practically the protrusions can be formed on any sliders.

Figure 4:
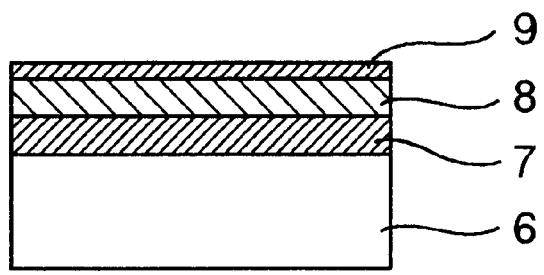
FIG. 4 is a schematic sectional view of a magnetic disk medium.

FIG. 4 schematically shows a sectional structure of the magnetic disk medium used in this example. In this example, a Co alloy magnetic film 7 (including a primary film) and a protective film 8 were formed on an NiP plated substrate 6, and thereon was coated a liquid lubricant 9 comprising a perfluoro polyether of which end-function was modified with $CH_2OH$. The additive to the lubricant was incorporated into a lubricant solution at the time of dip coating of the liquid lubricant.

Figure 5A:
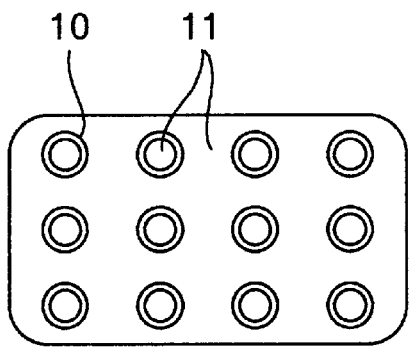
FIGS. 5A, 5B and 5C schematically show cylindrical and polygonal cylindrical protrusions.
Figure 5B:
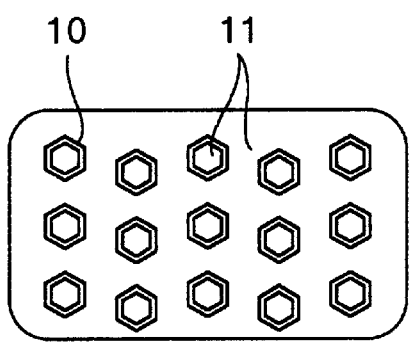
Figure 5C:
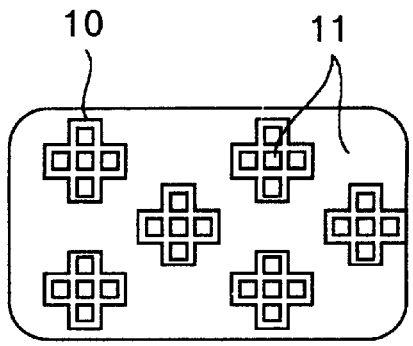

Protrusions as shown in FIGS. 5A, 5B and 5C were formed on the slider surface of the head shown in FIGS. 2 and 3. FIG. 5A shows an example of cylindrical protrusions, and 10 indicates a protruded portion and 11 indicates a dented portion. The cylindrical protrusions had an outer diameter of about 10–50 μm and an inner diameter of about 5–40 μm. FIG. 5B shows an example of hexagonal cylindrical protrusions, which had diagonals corresponding to the outer and inner diameters within the above ranges. FIG. 5C shows an example of combined square cylindrical protrusions, and one square cylindrical protrusion had diagonals corresponding to the outer and inner diameters within the above ranges. In these FIGS. 5A–5C, the protrusions were arranged periodically, but they may be arranged aperiodically.

Formation of the protrusions will be explained using FIGS. 6A, 6B, 6C, 6D, 6E and 6F. The slider surface of magnetic head comprised an Si film 13 and a carbon protective film 14 formed on a head material 12. A mask 15 for the formation of the desired protrusions was allowed to adhere to the carbon protective film 14 (FIG. 6A), and the portions of the carbon protective film 14 corresponding to the portions having to mask thereon was removed by etching treatment 16 (FIG. 6B). Thereafter, the mask 15 was removed to form the desired protrusions (FIG. 6C).

Figure 6A:
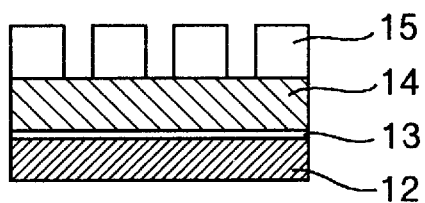
FIGS. 6A, 6B, 6C, 6D, 6E and 6F show steps for the formation of protrusions on the slider surface of head.
Figure 6D:
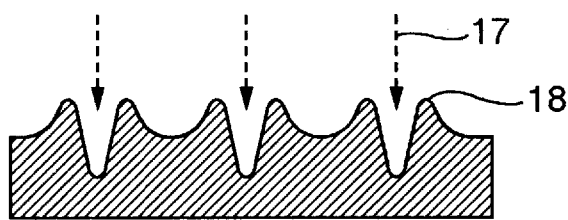
Figure 6B:
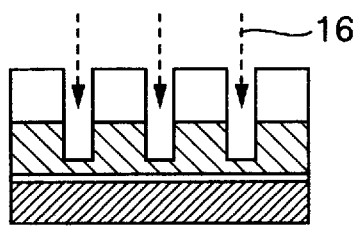
Figure 6E:
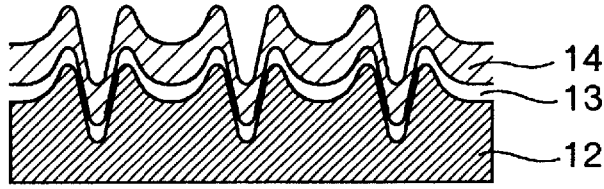
Figure 6C:
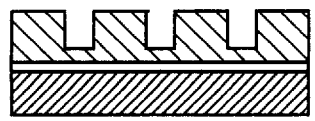
Figure 6F:
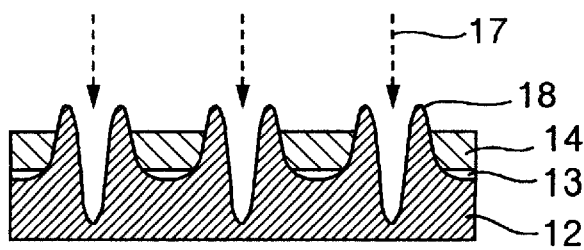

As another method, alumina-titanium carbide ($Al_2O_3$—TiC) on the slider surface was irradiated with laser beam 17 to form bump protrusions 18 which are generally called laser bumps (FIG. 6D). Then, on the head material 12 of this slider surface were formed Si film 13 and carbon protective film 14 (FIG. 6E). Two kinds of irradiation with laser beam were carried out, namely, irradiation of the slider material per se as mentioned above and irradiation after the formation of the Si film 13 and the carbon protective film 14 on the head material 12 (FIG. 6F). As a result, the similar bumps could be formed. By this method, cylindrical protrusions can be formed. The height of the protrusions can be optionally set depending on power of the laser beam, irradiation time, thickness of the carbon protective film and etching amount. In this example, protrusions were formed on the carbon protective film with 5 W in power of the laser beam. However, it is clear that when the slider material per se before formation of the protective film is subjected to protrusion forming processing by etching or the like and the protective film is formed thereon, an effective magnetic recording is possible without loss of the spacing of recording and reproduction.

Figure 7:
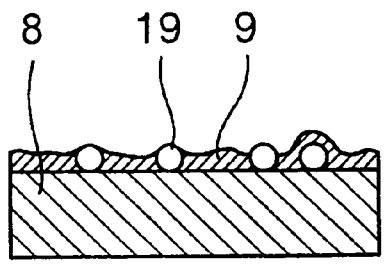
FIG. 7 schematically shows a lubricant film containing an additive on the magnetic disk medium.

On the other hand, it is considered as for the additive in the liquid lubricant of the magnetic disk medium that when the liquid lubricant is dip coated as mentioned above, there is formed such a structure as spherical additive 19 being dispersed in the liquid lubricant 9 on the surface of the carbon protective film 8 of the magnetic disk medium as shown schematically in FIG. 7. In this example, the liquid lubricant was formed at a thickness of about 2 nm.

Figure 8:
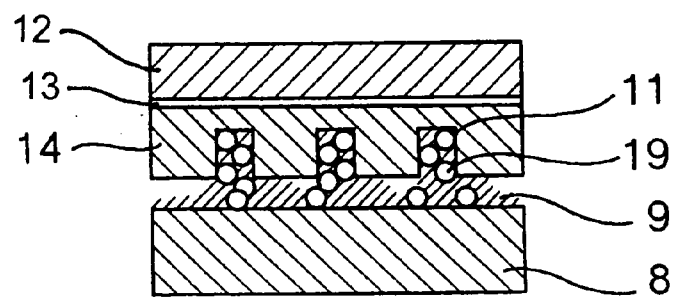
FIG. 8 schematically shows function of the additive and the protrusions.

When the head having protrusions on the slider surface shown in FIG. 5 and a magnetic disk medium to which an additive is added are contact slid with each other, there are considered the sliding friction and rolling friction generated due to the retention of additive 19 in the dented portions 11 of the protrusions and the shape of the additive as schematically shown in FIG. 8. It becomes possible to reduce wear of the head and the magnetic disk medium by making it possible to generate the rolling and sliding friction at several nm which has never been considered to be possible in the aforementioned conventional techniques.

Table 1 shows the additives used in the lubricant in this example, diameter of the additives and constituent elements of the additives. Furthermore, as comparative examples, examples of metal oxide fine particles are shown. Moreover, as comparative examples which show the effect of the shape of the additives, examples of straight chain type hydrocarbon compounds are also shown. The additives D-9, D-10 and D-11 in Table 1 are comparative examples.

TABLE 1

| No. | Additive | Constituent element | Diameter (nm) |
|---|---|---|---|
| D-1 | Cluster diamond | C | 5 |
| D-2 | Graphite-coated cluster diamond | C | 15 |
| D-3 | Flaren (C60) | C | 0.4 |
| D-4 | Melamine cyanurate | H,C,O,N | 20 |
| D-5 | Cyclic siloxane | H,C,O,Si | 1 |
| D-6 | Fluorinated benzene ring-modified phosphazene ring | H,C,O,N,F,P | 1.2 |
| D-7 | Starbarst polymer | H,C,O,N,F | 3 |
| D-8 | Polystyrene latex | H,C | 30 |
| D-9 | Silver oxide | O,Ag | 10 |
| D-10 | Copper oxide | O,Cu | 15 |
| D-11 | Stearic acid | H,C,O | 5 (length) |

Durability tests were conducted using these additives and by combining the magnetic disk medium shown in FIG. 4 and the head having the slider surface shown in FIG. 3 on which the protrusions shown in FIG. 5 were formed. The test results are shown in Table 2 and Table 3. Table 3 shows comparative examples. The surface roughness of the magnetic disk medium was about 2.5 nm in terms of the average surface roughness Ra measured by a tracer type three-dimensional roughness meter, and the height of the protrusions formed on the head was 8 nm. The head of type (a) is one having the cylindrical protrusions shown in FIG. 5A, the type (b) is one having the hexagonal cylindrical protrusions shown in FIG. 5B, and the type (c) is one having the combined square cylindrical protrusions shown in FIG. 5C. The additive was mixed with the liquid lubricant so as to give a concentration of 10 wt %, and the lubricant film was formed on the surface of the magnetic disk medium. The abrasion test was conducted using these heads by carrying out seeking of 25–30 mm in radius of the disk medium for 100 hours at a circumferential velocity of 2 m/s and thereafter measuring the wear of the magnetic disc medium and the head protective film by a tracer type roughness meter.

TABLE 2

| No. | Head type | Additive | Wear depth of protective film of head (nm) | Wear depth of protective film of medium (nm) |
|---|---|---|---|---|
| 1 | (a) | D-1 | 3 | <1 |
| 2 | (a) | D-2 | 1 | <1 |
| 3 | (a) | D-3 | 4 | <1 |
| 4 | (a) | D-4 | 1.5 | <1 |
| 5 | (a) | D-5 | 3 | 2 |
| 6 | (a) | D-6 | <1 | <1 |
| 7 | (a) | D-7 | <1 | <1 |
| 8 | (a) | D-8 | 8 | 2 |
| 9 | (b) | D-1 | 2.5 | <1 |
| 10 | (b) | D-2 | 1 | <1 |
| 11 | (b) | D-3 | 3 | <1 |
| 12 | (b) | D-4 | 2 | <1 |
| 13 | (b) | D-5 | 3.5 | 2 |
| 14 | (b) | D-6 | 1 | <1 |
| 15 | (b) | D-7 | <1 | <1 |
| 16 | (b) | D-8 | 7 | 2.5 |
| 17 | (c) | D-2 | 1 | <1 |
| 18 | (c) | D-6 | <1 | <1 |
| 19 | (c) | D-7 | <1 | <1 |

TABLE 3

| No. | Head type | Additive | Wear depth of protective film of head (nm) | Wear depth of protective film of medium (nm) |
|---|---|---|---|---|
| 20 | (a) | D-9 | 8 | 12 |
| 21 | (a) | D-10 | 8 | 10 |
| 22 | (a) | D-11 | 8 | 9 |
| 23 | (b) | D-9 | 8 | 15 |
| 24 | (b) | D-10 | 8 | 11 |
| 25 | (b) | D-11 | 8 | 12 |
| 26 | (c) | D-11 | 8 | 9 |
| 27 | No | D-1 | 7 | 5 |
| 28 | No | D-2 | 8 | 10 |
| 29 | No | D-4 | 8 | 12 |
| 30 | No | D-5 | 8 | 18 |
| 31 | No | D-6 | 6 | 5 |
| 32 | No | D-7 | 7 | 6 |
| 33 | (a) | No | 8 | 5 |
| 34 | (b) | No | 8 | 6 |
| 35 | (c) | No | 8 | 4 |
| 36 | No | No | 8 | 18 |

It can be seen from the above results that the additives are preferably in the form of sphere or polyhedron and are preferably not metallic fine particles, but carbon (C), carbon compounds, silicon compounds, phosphorus compounds, etc., and, for example, compounds comprising the elements H, C, N, O, F, Si, P or the like are preferred. It is considered that since molecules or particles comprising the elements H, C, N, O, F, Si, P or the like, particularly, molecules or particles containing H, N, O, Si or P are high in adsorption to the carbon protective film formed on the slider surface of the head, the silicon film, the material of the slider surface (e.g., alumina titanium carbide), etc., they can be readily transferred onto the slider surface of the head and readily retained. It can be seen that when the additives are used in combination with a head having cylindrical or polygonal protrusions formed on the slider surface, the most excellent effect can be obtained and substantially no wear occurred. On the other hand, wear was great in the comparative examples where no protrusions were formed on the slider surface, metallic fine particles were added as the additives or straight chain hydrocarbon additives were used.

In order to confirm that these are results derived from the effect of the additive being retained in the dented portions of the protrusions on the slider surface of head as shown in FIG. 8, distribution of the additive on the slider surface of head after the abrasion test was measured by TOF-SIMS (time-of-flight type secondary ion-mass spectrography). The distribution was measured on the head of type (b), aiming at P which is a characteristic fragment of the additive. As a result, P was present in a large amount in the dented portions of the protrusions, and thus it is considered that the additive was selectively retained by the protrusions and for this reason the wear was diminished.

Figure 9A:
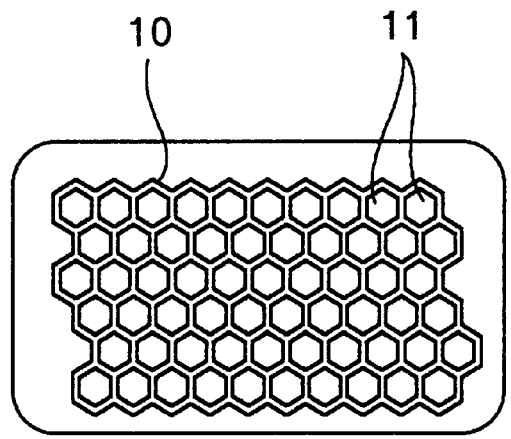
FIGS. 9A and 9B schematically show protrusions of honeycomb structure on the slider surface of head.
Figure 9B:
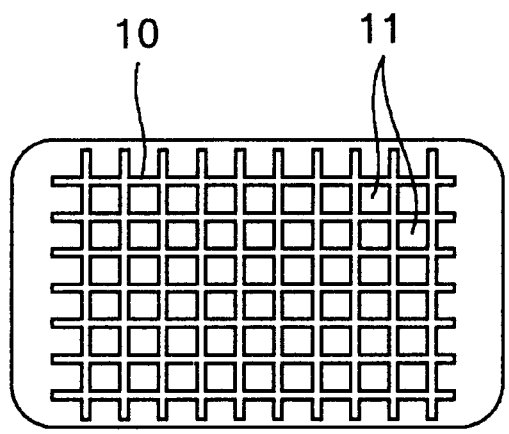

Furthermore, for the investigation of other shapes of protrusions, the hexagonal honeycomb structure protrusions as shown in FIG. 9A and the square honeycomb structure protrusions as shown in FIG. 9B were formed on the slider surface of the heads. Hereinafter, the former is called head of type (d) and the latter is called head of type (e). In FIG. 9, these protrusions are continuously arranged, but they may be arranged separately, namely, the honeycomb structures are arranged in the form of blocks. The heads having these protrusions were subjected to the above-mentioned durability test. The additive was D-6 shown in Table 1. The results are shown in Table 4.

TABLE 4

| No. | Head type | Additive | Wear depth of protective film of head (nm) | Wear depth of protective film of medium (nm) |
|---|---|---|---|---|
| 37 | (d) | D-6 | <1 | <1 |
| 38 | (e) | D-6 | <1 | <1 |

It can be seen from the results that the honeycomb structure protrusions also diminished the wear of the magnetic disk medium and the slider surface of head. That is, as expected, the lubricant additive was effectively retained by the formation of the honeycomb structures.

Next, an example where the surface roughness of the magnetic disk medium was changed will be explained. In the magnetic disk medium, protrusions were formed on the surface of an NiP plated substrate by diamond abrasive grains. In the example, the surface roughness of the medium was changed by changing the size of the diamond abrasive grains. The results are shown in Table 5.

TABLE 5

| No. | Surface roughness of medium Ra (nm) | Additive | Diameter (nm) | Wear depth of protective film of head (nm) | Wear depth of protective film of medium (nm) |
|---|---|---|---|---|---|
| 39 | 0.2 | D-6 | 1.2 | <1 | <1 |
| 40 | 0.6 | D-6 | 1.2 | <1 | <1 |
| 41 | 0.8 | D-6 | 1.2 | <1 | <1 |
| 42 | 1.2 | D-6 | 1.2 | <1 | <1 |
| 43 | 2.5 | D-6 | 1.2 | <1 | <1 |
| 44 | 3.6 | D-6 | 1.2 | <1 | 2 |
| 45 | 4.3 | D-7 | 3 | <1 | 1 |
| 46 | 4.9 | D-7 | 3 | 2 | 5 |
| 47 | 5.2 | D-7 | 3 | 5 | 3.5 |
| 48 | 6.6 | D-7 | 3 | 8 | 15 |
| 49 | 7.8 | D-7 | 3 | 8 | 22 |

Figure 10:
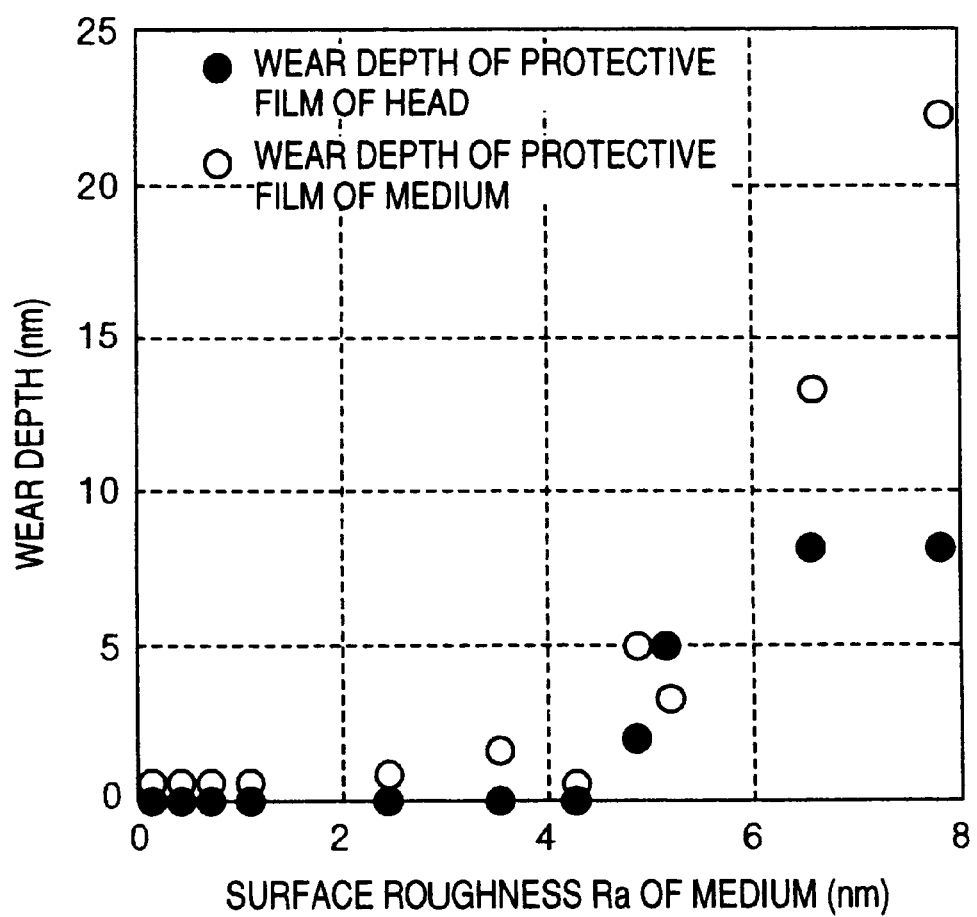
FIG. 10 shows results of abrasion test which are expressed using the surface roughness of the magnetic disk medium as a parameter.

The above-mentioned abrasion test was conducted on these magnetic disk media using the head of head type (a). As a result, it can be seen that when size of the additive is selected, there is an area where wear is small in the range of average surface roughness Ra of 0.2–5 nm. The results are shown in FIG. 10. The wear shows a tendency to increase with increase in surface roughness. It is considered that this is because the height of protrusions of the magnetic disk medium was high and the protrusions directly contacted with the slider surface of head to reduce the effect of the lubricant additive aimed at by the present invention.

An example will be shown where the size of the additive is taken as a parameter in order to examine the influence of the diameter of the additive. The results are shown in Table 6.

TABLE 6

| No. | Surface roughness of medium Ra (nm) | Additive | Diameter (nm) | Wear depth of protective film of head (nm) | Wear depth of protective film of medium (nm) |
|---|---|---|---|---|---|
| 50 | 2.5 | D-3 | 0.4 | 4 | <1 |
| 51 | 2.5 | D-6 | 1.2 | <1 | <1 |
| 52 | 2.5 | D-7 | 3 | <1 | <1 |
| 53 | 2.5 | D-7 | 4 | <1 | <1 |
| 54 | 2.5 | D-2 | 15 | 1 | <1 |
| 55 | 2.5 | D-4 | 10 | 1 | <1 |
| 56 | 2.5 | D-4 | 20 | 1.5 | <1 |
| 57 | 2.5 | D-8 | 15 | 1.5 | 2 |
| 58 | 2.5 | D-8 | 30 | 8 | 2 |
| 59 | 2.5 | D-8 | 50 | 8 | 13 |
| 60 | 2.5 | D-8 | 100 | 8 | 9 |
| 61 | 2.5 | No | 0 | 8 | 5 |

Figure 11:
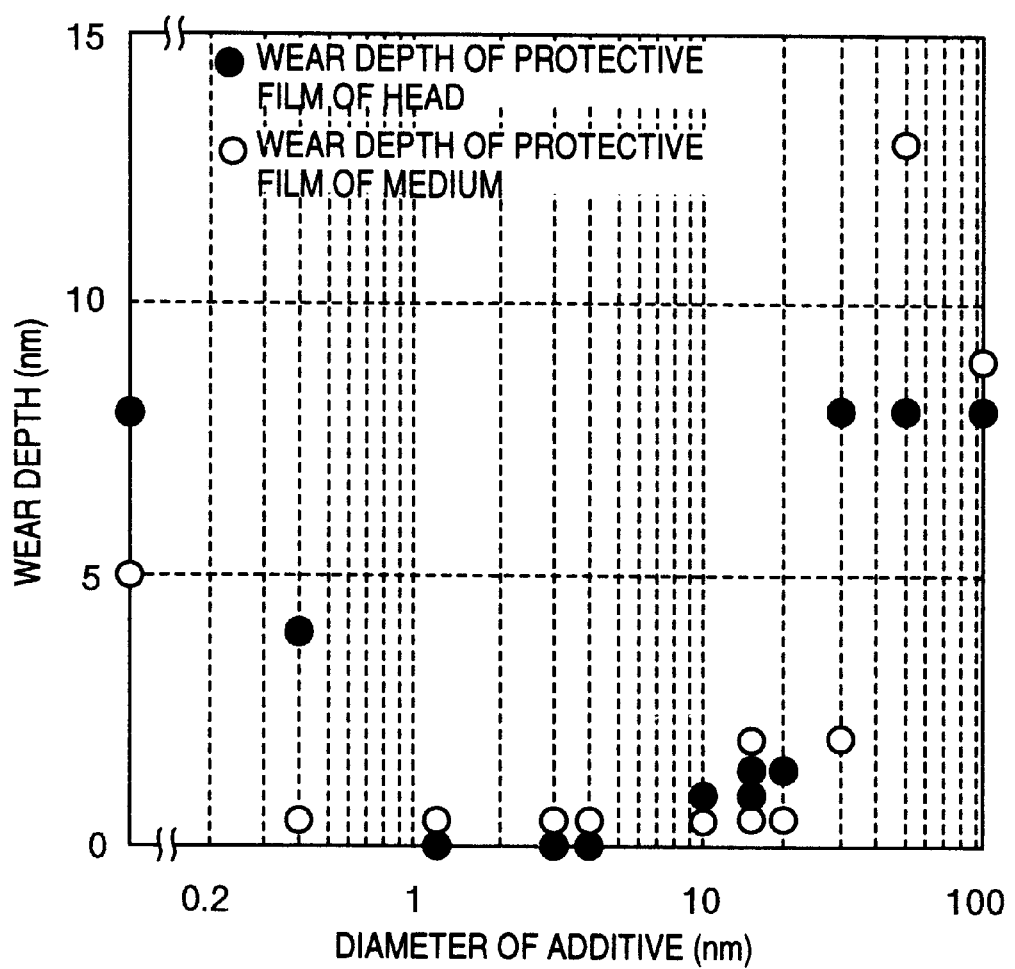
FIG. 11 shows results of abrasion test which are expressed using the diameter of the additive as a parameter.

These additives were similarly coated on the magnetic disk media of 2.5 nm in average surface roughness Ra. The above-mentioned abrasion test was conducted using the head of head type (a). The results are shown in FIG. 11. As can be seen from the test results, the wear was diminished when the diameter of the additive was 0.4–30 nm, and markedly diminished when the diameter of the additive was 0.4–20 nm. However, when the diameter is great, the space between the head and the recording magnetic film at the time of recording and reproduction is increased even if the wear is small, and this is not preferred. Therefore, since the diameter of the additive is restricted by the spacing, so much great diameter is not preferred.

Figure 12:
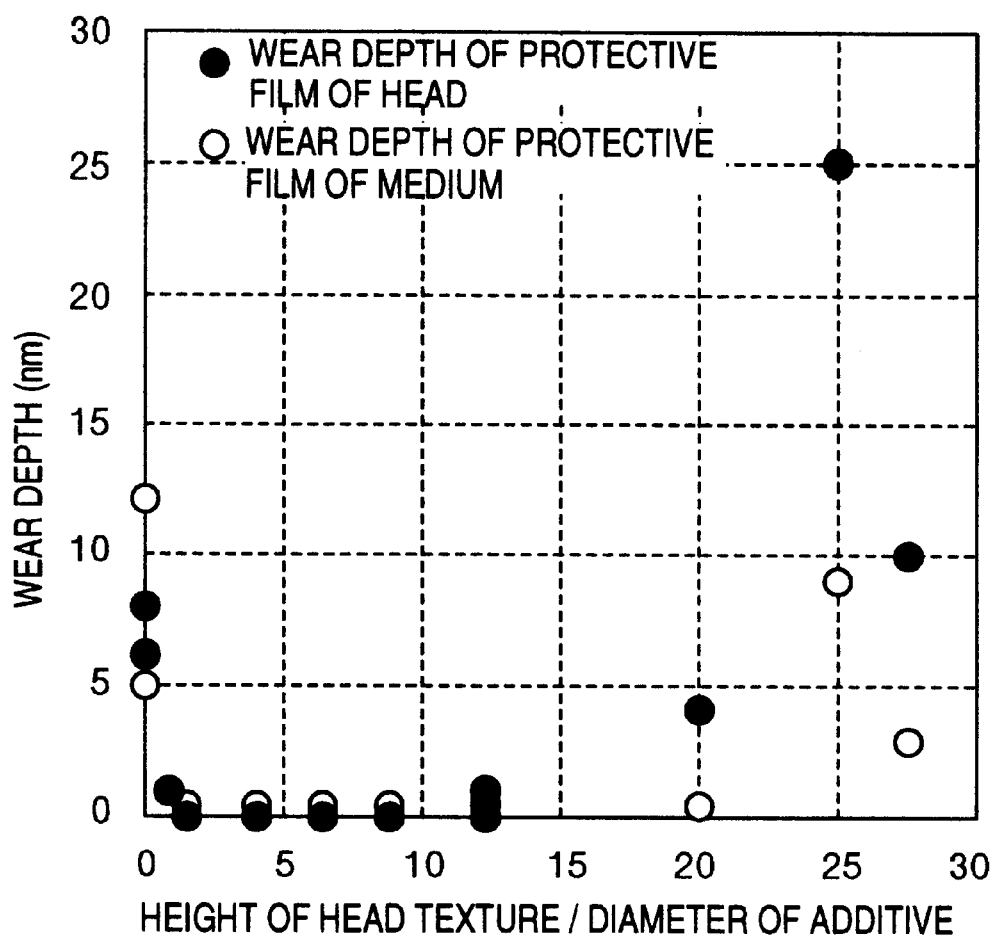
FIG. 12 shows results of abrasion test which are expressed using a ratio of the height of the protrusions on the slider surface and the diameter of the additive as a parameter.

Furthermore, an example as to the relation between the diameter of the additive and the height of the protrusions formed on the slider surface will be shown. Table 7 shows an example where the height of the protrusion as parameter was combined with additives D-3, 6, 7. Moreover, the results of abrasion test conducted are shown FIG. 12.

TABLE 7

| No. | Height of protrusions (nm) | Additive | Diameter (nm) | Protrusion (height/diameter) | Wear depth of protective film of head (nm) | Wear depth of protective film of medium (nm) |
|---|---|---|---|---|---|---|
| 62 | 0 | D-3 | 0.4 | 0 | 8 | 12 |
| 63 | 5 | D-3 | 0.4 | 12.5 | 1 | <1 |
| 64 | 8 | D-3 | 0.4 | 20 | 4 | <1 |
| 65 | 11 | D-3 | 0.4 | 27.5 | 10 | 3 |
| 66 | 0 | D-6 | 1.2 | 0 | 6 | 5 |
| 67 | 5 | D-6 | 1.2 | 4.17 | <1 | <1 |
| 68 | 8 | D-6 | 1.2 | 6.67 | <1 | <1 |
| 69 | 11 | D-6 | 1.2 | 9.17 | <1 | <1 |
| 70 | 15 | D-6 | 1.2 | 12.5 | <1 | <1 |
| 71 | 30 | D-6 | 1.2 | 25 | 25 | 9 |
| 72 | 2.5 | D-7 | 3 | 0.83 | 1 | 1 |
| 73 | 5 | D-7 | 3 | 1.67 | <1 | <1 |

As can be seen from the results, there is an optimum relation between the additive and the height of the protrusions on the slider surface of head. That is, the height of the protrusions is preferably greater than about ½ of the diameter of the additive, and is more preferably about ½–20 times the diameter of the additive. This result shows that in case the protrusions are small as compared with the diameter of the additive, the additive is not retained in the dented portions of the protrusions, and in case the protrusions are great, the contact between the additive and the surface of the magnetic disk medium becomes not intimate, and hence the sliding friction or rolling friction is difficult to occur. Accordingly, it is considered to be preferable to control the diameter of the additive and the height of the protrusions to the above range.

Figure 13:
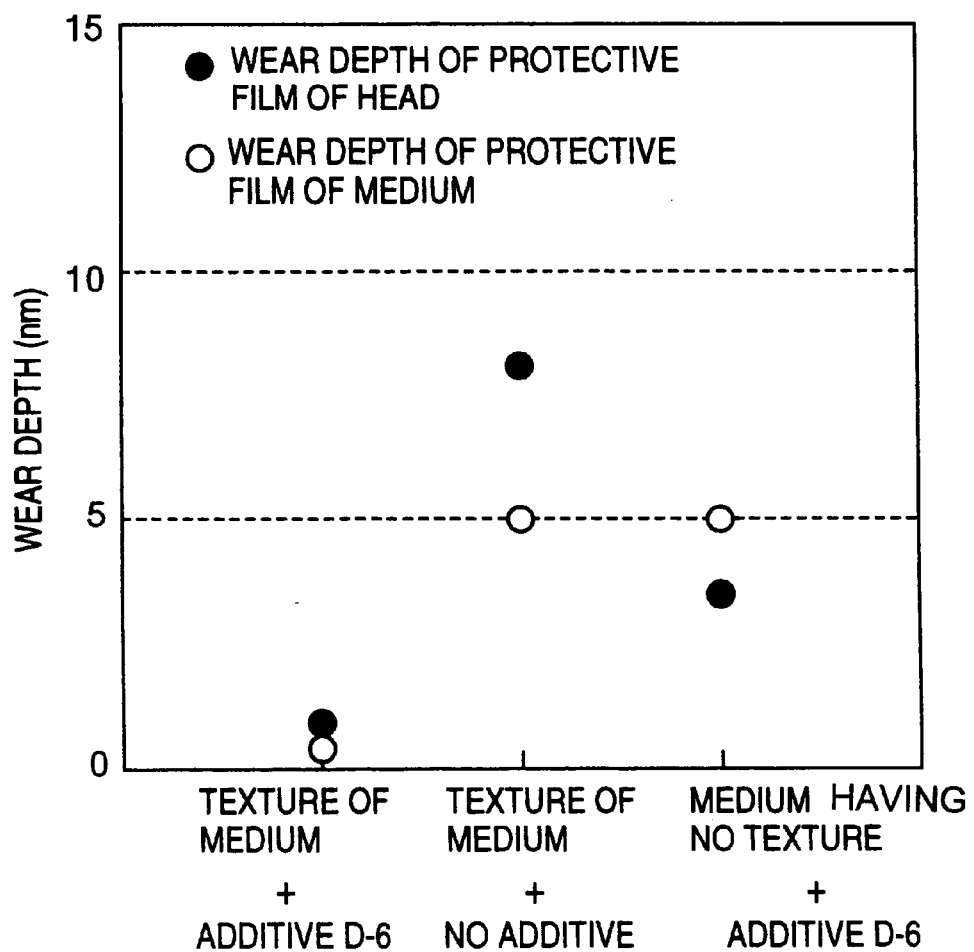
FIG. 13 shows results of durability test when the protrusions were formed on the surface of the magnetic disk.

Finally, an explanation will be given of the case where protrusions of the same shape as the protrusions of the head of type (a) shown in FIG. 5 were formed on the magnetic disk medium. The desired protrusions were formed in the same manner as on the head by etching the protective film on the surface of the magnetic disk medium. The height of the protrusions was 10 nm. This magnetic disk medium was coated with a lubricant containing the additive D-6. The abrasion test was conducted by combining this magnetic disk medium with a head having no protrusions. As comparative examples, the same test was conducted using a magnetic disk medium which had protrusions, but was coated with a lubricant containing no additive, and a magnetic disk medium which had no protrusions, but was coated with a lubricant containing the additive. The results are shown in FIG. 13. As can be seen from FIG. 13, the wear can be diminished when the protrusions as formed on the head are formed on the magnetic disk and the additive as mentioned in the examples is added to the lubricant.

The above is an example of cylindrical protrusions, but the similar effect can also be obtained in the case of polygonal cylindrical protrusions and honeycomb structure protrusions. Furthermore, these protrusions may be formed on both the magnetic disk medium and the head slider.

According to the present invention, a magnetic disk apparatus high in recording density (small in flying height) and excellent in wear resistance can be obtained. Furthermore, the present invention can also be applied to the future techniques such as near-contact or contact recording.

What is claimed is:

1. A magnetic disk apparatus having a magnetic head having a slider surface for recording and reproduction and a magnetic disk recording a signal disposed opposite each other, a surface of the magnetic disk being provided with a lubricant film, wherein at least one of the slider surface of the magnetic head and the surface of the disk has cylindrical or polygonal cylindrical protrusions thereby forming dent portions and an additive comprising spherical or polyhedral molecules or particles, having (a diameter) within the range of 0.4–30 nm is dispersed in the lubricant film, the additive being retained in the dent portions so that low frictional force can be maintained for long periods of time.

2. A magnetic disk apparatus according to claim 1, wherein the additive is at least one selected from the group consisting of carbon, a carbon compound, a silicon compound and a phosphorus compound.

3. A magnetic disk apparatus according to claim 1, wherein the additive is added in an amount of 0.5–15 wt % to the lubricant.

4. A magnetic disk apparatus according to claim 1, wherein a surface roughness of the magnetic disk medium is 0.2–5 nm in terms of average surface roughness Ra.

5. A magnetic disk apparatus according to claim 1, wherein the height of the protrusions is ½–20 times the (diameter) diameter of the additive particles or molecules.

6. A magnetic disk apparatus having a magnetic head having a slider surface for recording and reproduction and a magnetic disk recording a signal disposed opposite each other, a surface of the magnetic disk being provided with a lubricant film, wherein at least one of the slider surface of the magnetic head and the surface of the disk has protrusions of a honeycomb structure thereby forming dent portions and an additive comprising spherical or polyhedral molecules or particles, having (a diameter) within the range of 0.4–30 nm is dispersed in the lubricant film, the additive being retained in the dent portions so that low frictional force can be maintained for long periods of time.

7. A magnetic disk apparatus according to claim 6, wherein the additive is at least one selected from the group consisting of carbon, a carbon compound, a silicon compound and a phosphorus compound.

8. A magnetic disk apparatus according to claim 6, wherein the additive is added in an amount of 0.5–15 wt % to the lubricant.

9. A magnetic disk apparatus according to claim 6, wherein a surface roughness of the magnetic disk medium is 0.2–5 nm in terms of average surface roughness Ra.

10. A magnetic disk apparatus according to claim 6, wherein the height of the protrusions is ½–20 times the (diameter) diameter of the additive particles or molecules.

* * * * *